(12) United States Patent
Moorhead et al.

(10) Patent No.: US 8,531,160 B2
(45) Date of Patent: Sep. 10, 2013

(54) RECHARGEABLE BATTERY MANAGEMENT

(75) Inventors: Brian C. Moorhead, Willis, MI (US);
Brian D. Rutkowski, Ypsilanti, MI (US)

(73) Assignee: A123 Systems, Inc., Waltham, MA (US)

( * ) Notice: Subject to any disclaimer, the term of this patent is extended or adjusted under 35 U.S.C. 154(b) by 334 days.

(21) Appl. No.: 12/854,274

(22) Filed: Aug. 11, 2010

(65) Prior Publication Data
US 2012/0038322 A1 Feb. 16, 2012

(51) Int. Cl.
*H02J 7/00* (2006.01)

(52) U.S. Cl.
USPC .......................................... 320/136; 320/116

(58) Field of Classification Search
USPC .......................................................... 320/136
See application file for complete search history.

(56) References Cited

U.S. PATENT DOCUMENTS

| | | | | |
|---|---|---|---|---|
| 4,737,702 A | * | 4/1988 | Koenck | 320/114 |
| 5,206,578 A | | 4/1993 | Nor | |
| 5,268,630 A | | 12/1993 | Bhagwat et al. | |
| 6,025,695 A | * | 2/2000 | Friel et al. | 320/106 |
| 6,078,165 A | * | 6/2000 | Ashtiani et al. | 320/116 |
| 6,731,770 B1 | * | 5/2004 | Vonlanthen | 381/330 |
| 6,983,212 B2 | | 1/2006 | Burns | |
| 7,386,404 B2 | | 6/2008 | Cargonja et al. | |
| 7,400,113 B2 | | 7/2008 | Osborne | |
| 7,489,106 B1 | | 2/2009 | Tikhonov | |
| 7,567,060 B1 | | 7/2009 | Atcitty et al. | |
| 7,876,071 B2 | * | 1/2011 | Chen et al. | 320/136 |
| 7,973,534 B2 | * | 7/2011 | Tatebayashi et al. | 324/433 |
| 2005/0099161 A1 | * | 5/2005 | Sato | 320/134 |
| 2007/0247118 A1 | | 10/2007 | Ho | |
| 2009/0243548 A1 | | 10/2009 | Hoff | |
| 2009/0278505 A1 | * | 11/2009 | Toya et al. | 320/152 |
| 2009/0295329 A1 | * | 12/2009 | Yugou | 320/116 |
| 2009/0326842 A1 | | 12/2009 | Thomas-Alyea | |
| 2011/0031976 A1 | * | 2/2011 | Ishikawa et al. | 324/433 |

FOREIGN PATENT DOCUMENTS
WO 2008095315 A1 8/2008

* cited by examiner

*Primary Examiner* — M'Baye Diao
(74) *Attorney, Agent, or Firm* — Alleman Hall McCoy Russell & Tuttle LLP

(57) ABSTRACT

Systems and methods for adjusting sampling and switching rates of a battery management system are provided. For example, a rate at which different battery cells of a battery cell stack are in communication with an analog to digital converter may be adjusted in response to conditions of a battery cell.

17 Claims, 11 Drawing Sheets

RECHARGEABLE BATTERY MANAGEMENT

TECHNICAL FIELD

The present description relates to charge-discharge management in rechargeable batteries.

BACKGROUND AND SUMMARY

Rechargeable batteries may be used to store and supply electricity in various applications. Examples of rechargeable batteries include lead acid, nickel cadmium (NiCd), nickel metal hydride (NiMH), lithium ion (Li-ion), and lithium ion polymer (Li-ion polymer), among others.

In some examples, rechargeable batteries may degrade if overcharged, e.g., if a voltage across a battery rises above a predetermined threshold during charging. Likewise, batteries may degrade if overdischarged, e.g., if a voltage across a battery falls below a predetermined threshold during discharging. Thus, various battery management systems may be employed to monitor rechargeable batteries during battery charge and/or discharge cycles so as to reduce battery degradation due to overcharging or overdischarging.

One such approach, e.g., as described in U.S. Pat. No. 5,268,630, includes sampling battery voltage at a fixed rate, and selectively utilizing more or less data samples over time to identify a charging status of the battery.

However, the inventors herein have recognized that there may be a large number of cells included in a battery, and degradation may occur on a per-cell voltage level, e.g., in the context of a battery system powering a vehicle. As such, in order to reduce electronic hardware requirements, the same analogue to digital converter may be used to sample voltages of a plurality of cells. For example, by changing a rate at which an analogue to digital converter is coupled among a plurality of cells, it may be possible to obtain faster samples when needed, while also enabling reduced use of analogue to digital converter hardware.

The inventors herein have also recognized that battery management systems which monitor the cells of one or more batteries may be at least partially powered by said batteries. Thus, such battery management systems may reduce an amount of energy stored in the one or more batteries. For example, when a battery management system performs a measurement on a cell in a battery, an amount of energy may be drawn from said battery. Additionally, energy may be drawn from the battery when a battery management system communicates measurements or other diagnostic information over a communication bus. Further, such measurement communications may reduce available bandwidth on a communication bus. Such parasitic energy consumption by a battery management system may result in a substantial reduction in availability of energy stored in the batteries, particularly in battery systems employing a plurality of cells. Further, such bandwidth reduction may reduce operational efficiency of battery management systems.

In one example approach, a method for switching sampling of battery cells of a battery pack is provided. The example method comprises: adjusting a rate at which different battery cells of a battery cell stack are in communication with an analog to digital converter, where said rate is adjusted in response to a condition of a battery cell. For example, a rate at which different battery cells of a battery cell stack are in communication with an analog to digital converter may be adjusted based on a temperature and/or state of charge of a battery cell, so that faster data sampling can be provided at higher temperatures, for example.

In this way, parasitic energy consumption by a battery management system may be reduced resulting in an increase in an amount of available energy stored in the batteries while at the same time obtaining faster samples when needed, while also enabling reduced use of analogue to digital converter hardware. For example, the number of times energy is drawn from battery cells by a battery management system for measurement purposes may be reduced. Additionally, the number of communication messages which use battery power to drive a communication bus may be reduced leading to an increase in available bandwidth on a communication bus.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Rechargeable batteries may be used to store and supply electricity in various applications. For example, such batteries may be used to at least partially propel a vehicle via delivering power to wheels via a motor, such as in the example vehicle shown in FIG. 1.

Figure 2:
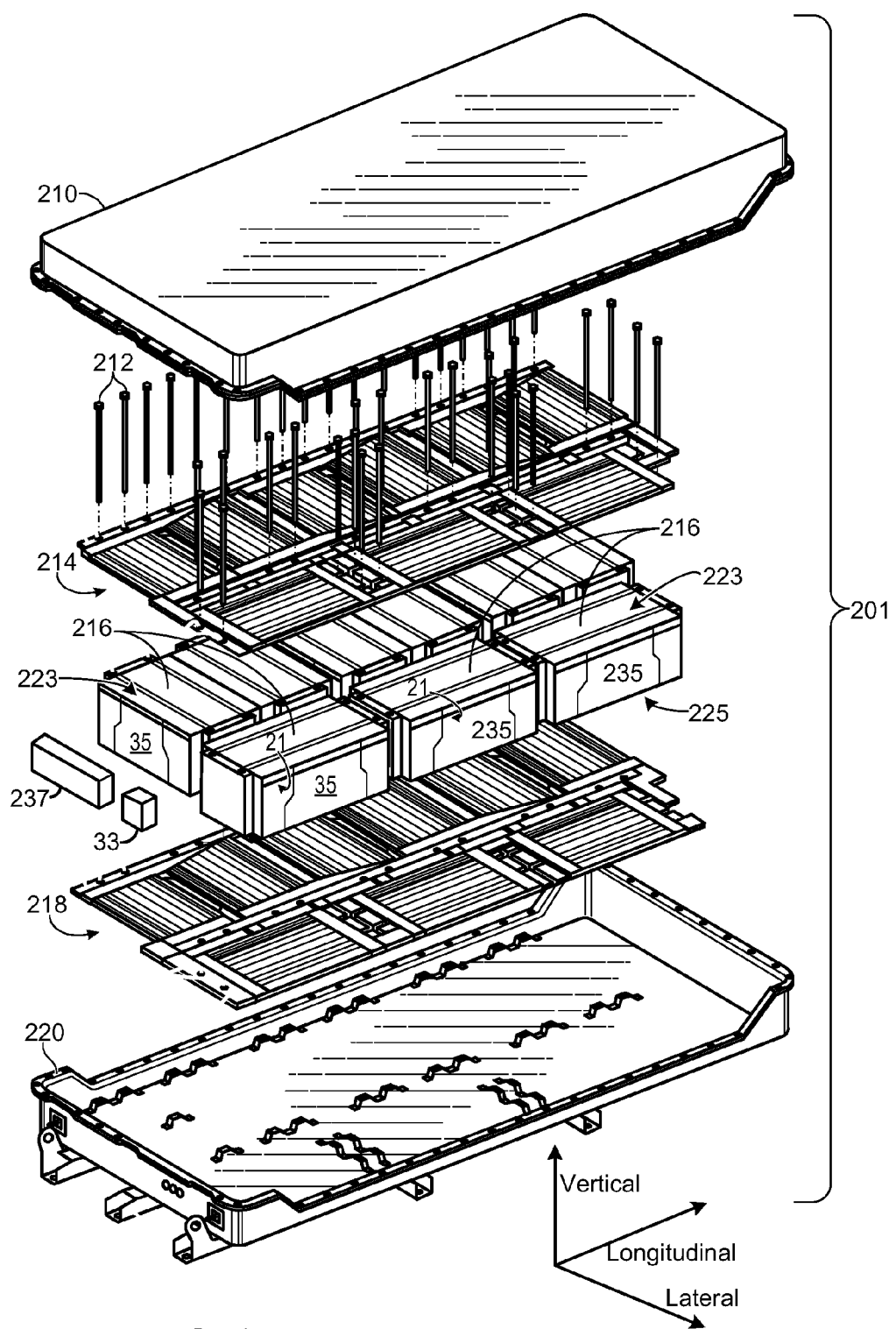
FIG. 2 shows an exploded schematic view of an example battery pack.
Figures 3, 4:
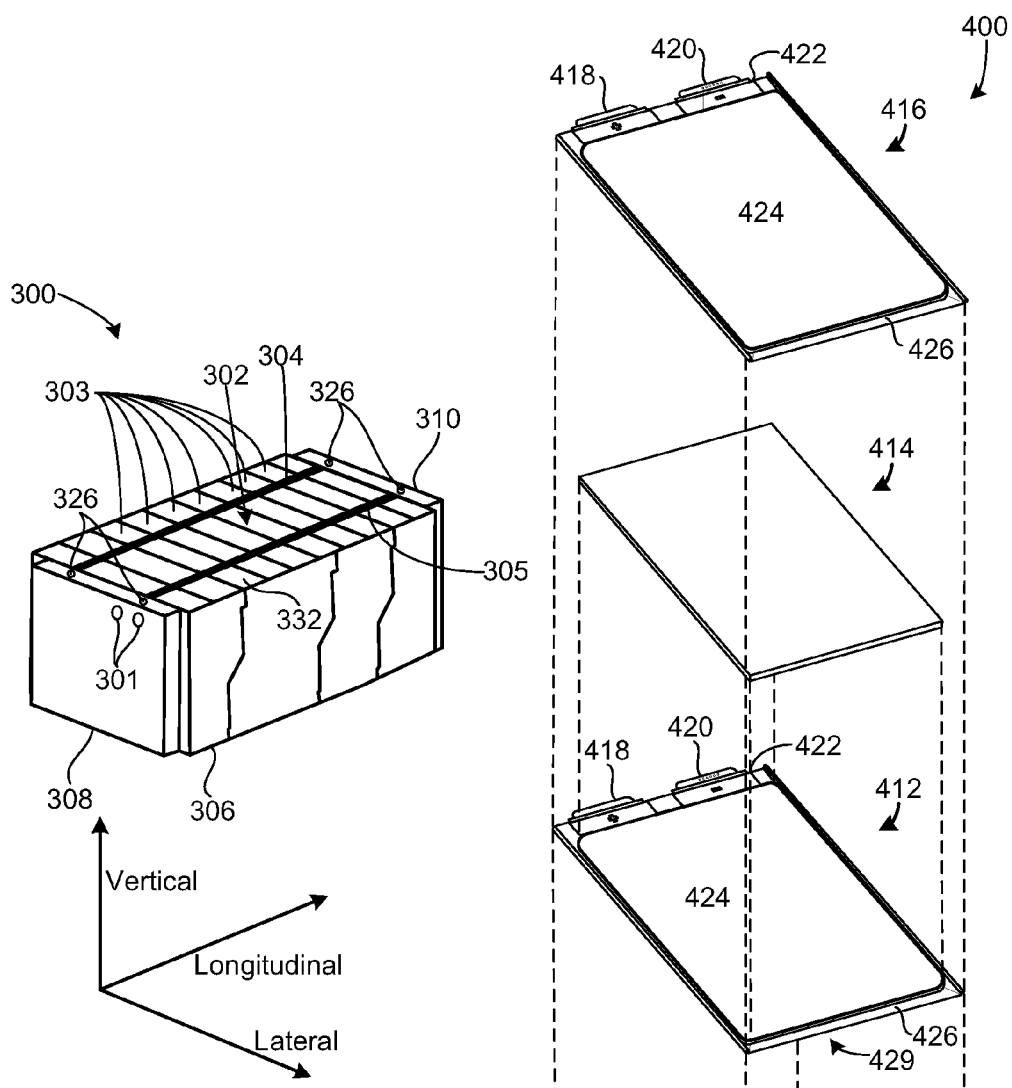
FIG. 3 shows a schematic view of an example battery module.
FIG. 4 shows an exploded schematic view of an example battery cell stack.

In such applications, batteries may be included in a battery pack configuration, as shown in FIG. 2. Such battery packs may include a plurality of battery modules, as shown in FIG. 3. Each battery module in a battery pack may in turn include a plurality of battery cells. The battery cells in a battery module may be arranged in a stacked configuration, such as shown in FIG. 4.

In order to reduce battery degradation due to overcharging or overdischarging, various battery management systems may be included in a battery pack. Such battery management systems may monitor various components within a battery pack. For example, a battery management system, such as shown schematically in FIG. 5, may be configured to sample various operating conditions, e.g., temperature and voltage, of a plurality of cells in a battery so that said operating conditions may be adjusted to reduce battery degradation.

In some examples, the sampling of a plurality of cells (e.g., a group or sub-group of cells) in a battery pack may be adjusted via switches configured to selectively put the battery cells in communication with analogue to digital converters in the battery pack so that, for example, a plurality of cells may be sampled via a common analogue to digital converter.

Figure 6:
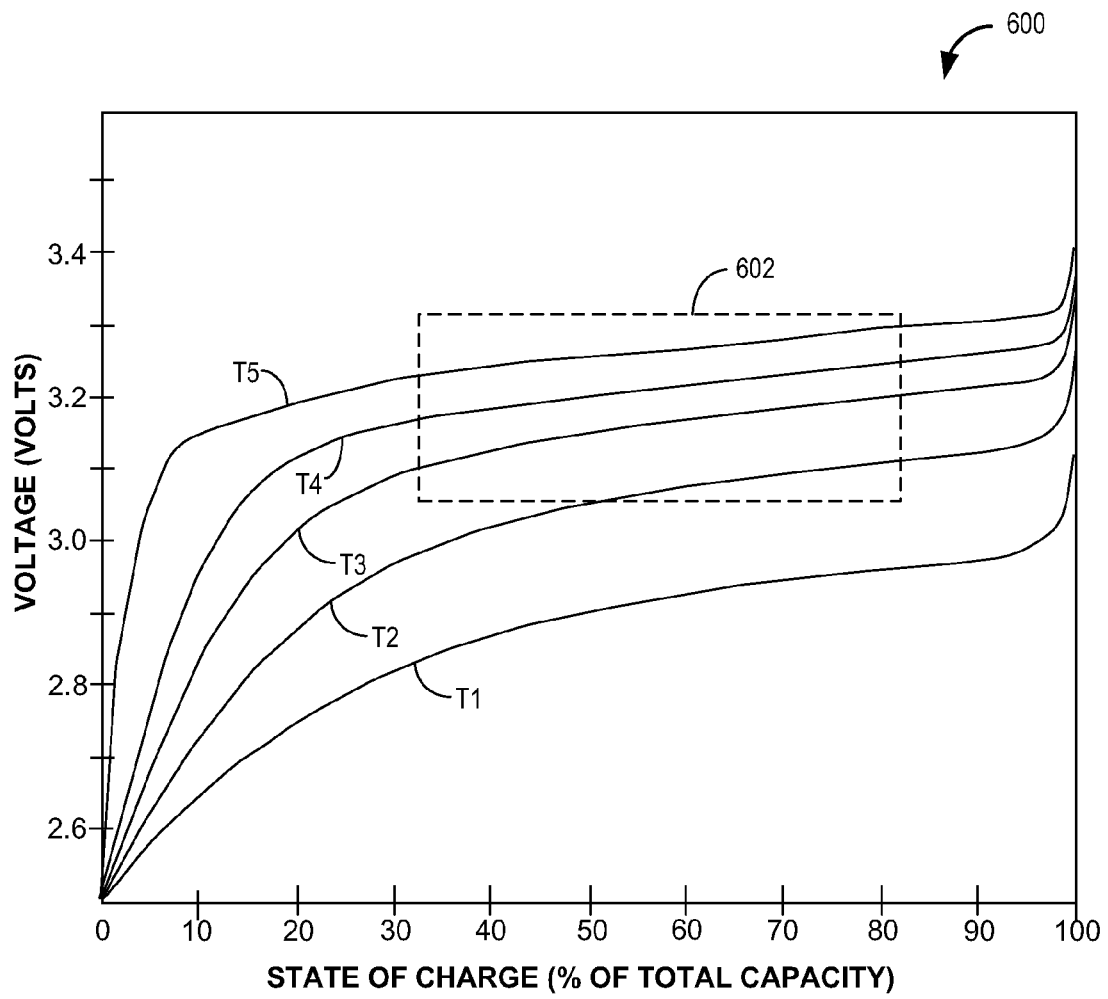
FIG. 6 shows an example plot of a voltage profile of a battery cell during discharge.

Each battery cell in a battery pack may have a characteristic voltage profile, e.g., as shown in FIG. 6, which may depend on cell temperature and cell capacity, among other parameters. Different regions of such a cell voltage curve may have different rates of change that are physically plausible depending on the vehicle application, state of charge, temperature, capacity, etc., of the cell; thus the rate at which a cell is switched to the analog to digital converter may be adjusted via switches based on where in the voltage curve the state of the cell resides.

Figure 7:
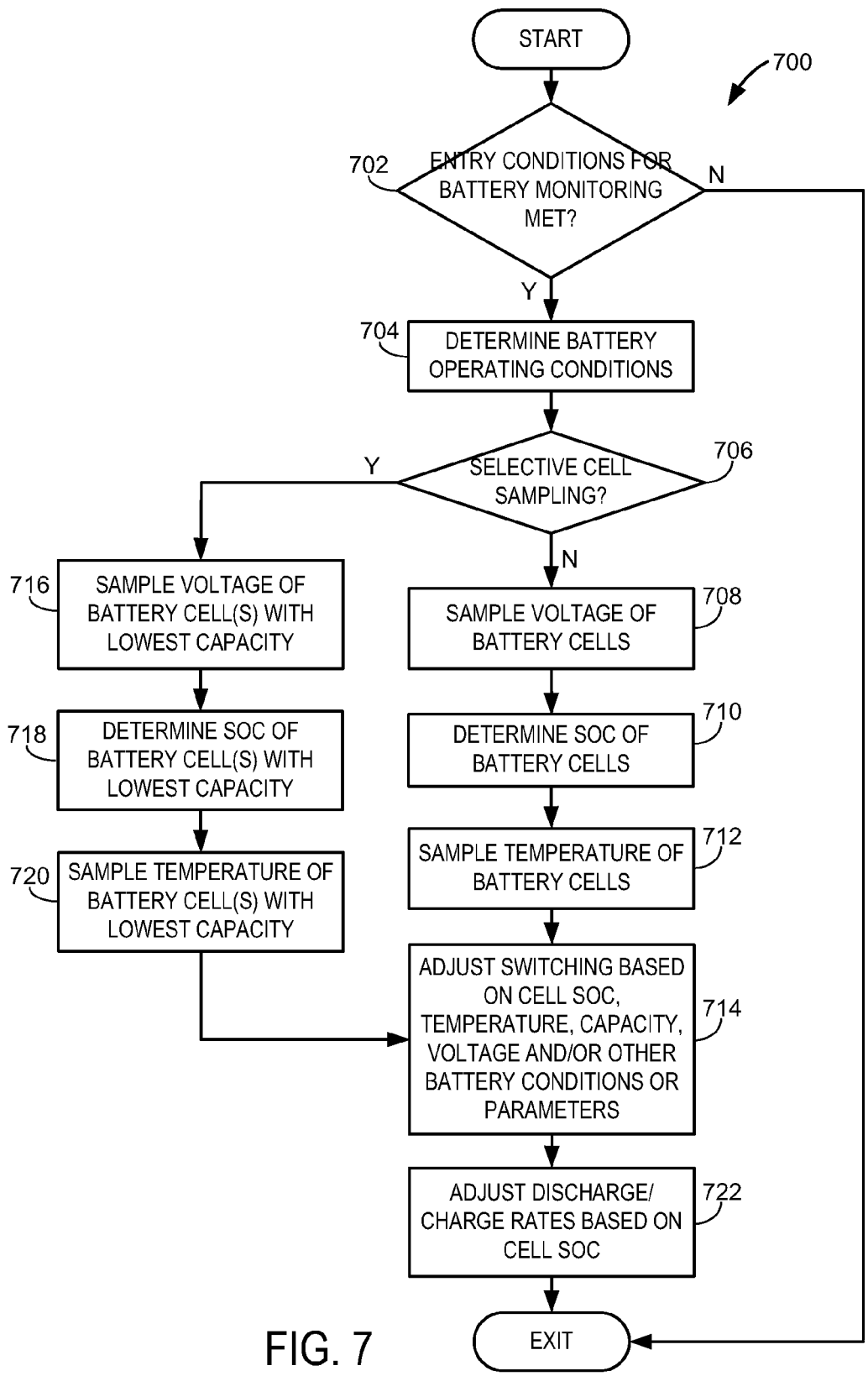
FIG. 7 shows an example method for monitoring a battery.

In some examples, the same analogue to digital converter may be used to sample voltages of a plurality of cells in order to reduce the electronics hardware requirements. Further, the switching rate (for taking a cell voltage sample) among the cells in a battery pack, or among a sub-group of cells in a pack, may be adjusted via switching devices during battery monitoring, e.g., as shown in FIG. 7. Various switching devices may selectively put a plurality of cells in communication with an analogue to digital converter for sampling. For example, by changing a rate at which an analogue to digital converter is coupled among a plurality of cells, it may be possible to obtain faster cell samples when needed, while also enabling reduced use of analogue to digital converter hardware resulting in reduced parasitic energy and bandwidth consumption by a battery management system.

Figure 8:
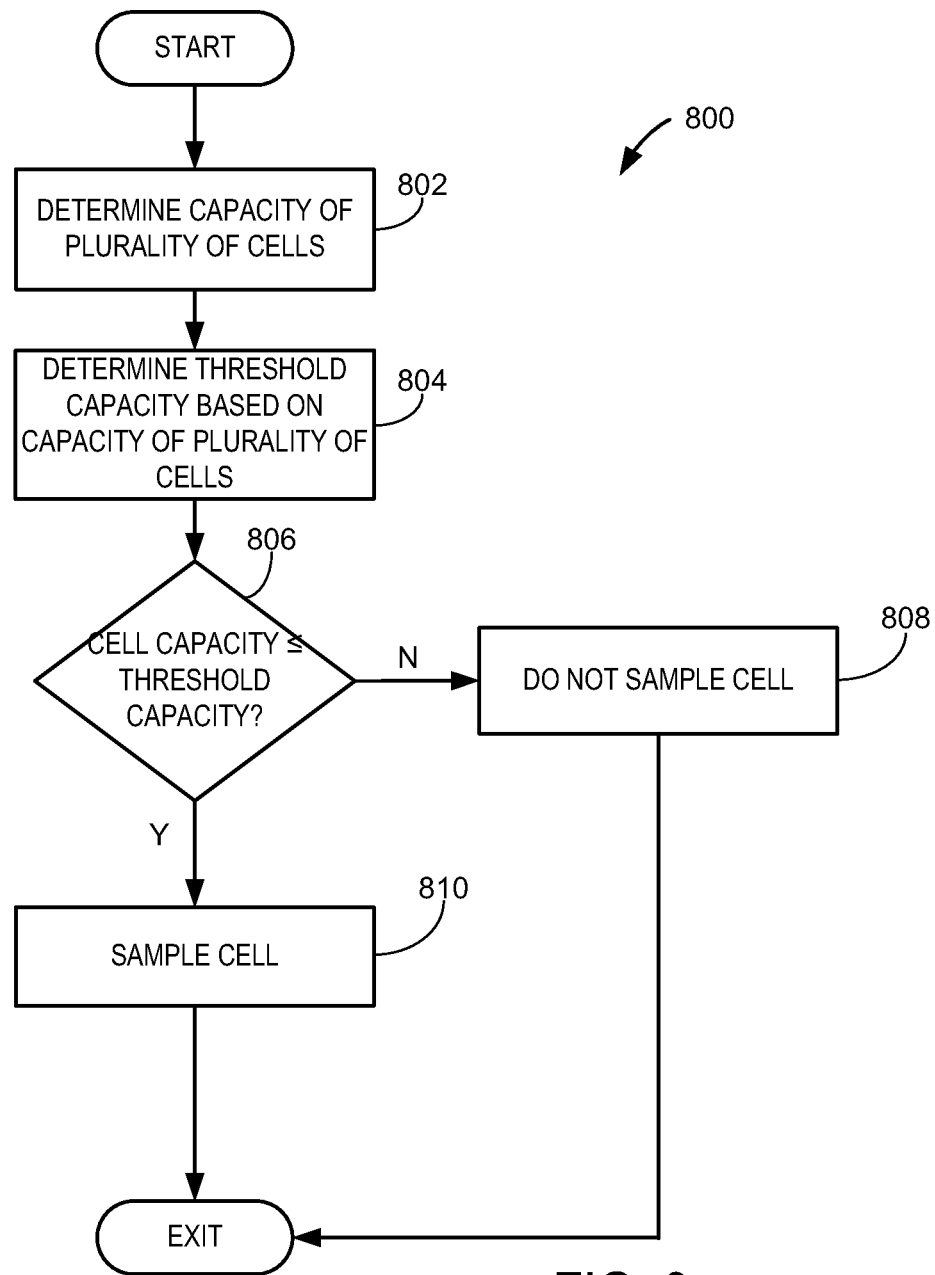
FIG. 8 shows an example method for selectively sampling battery cells in a battery.
Figure 9:
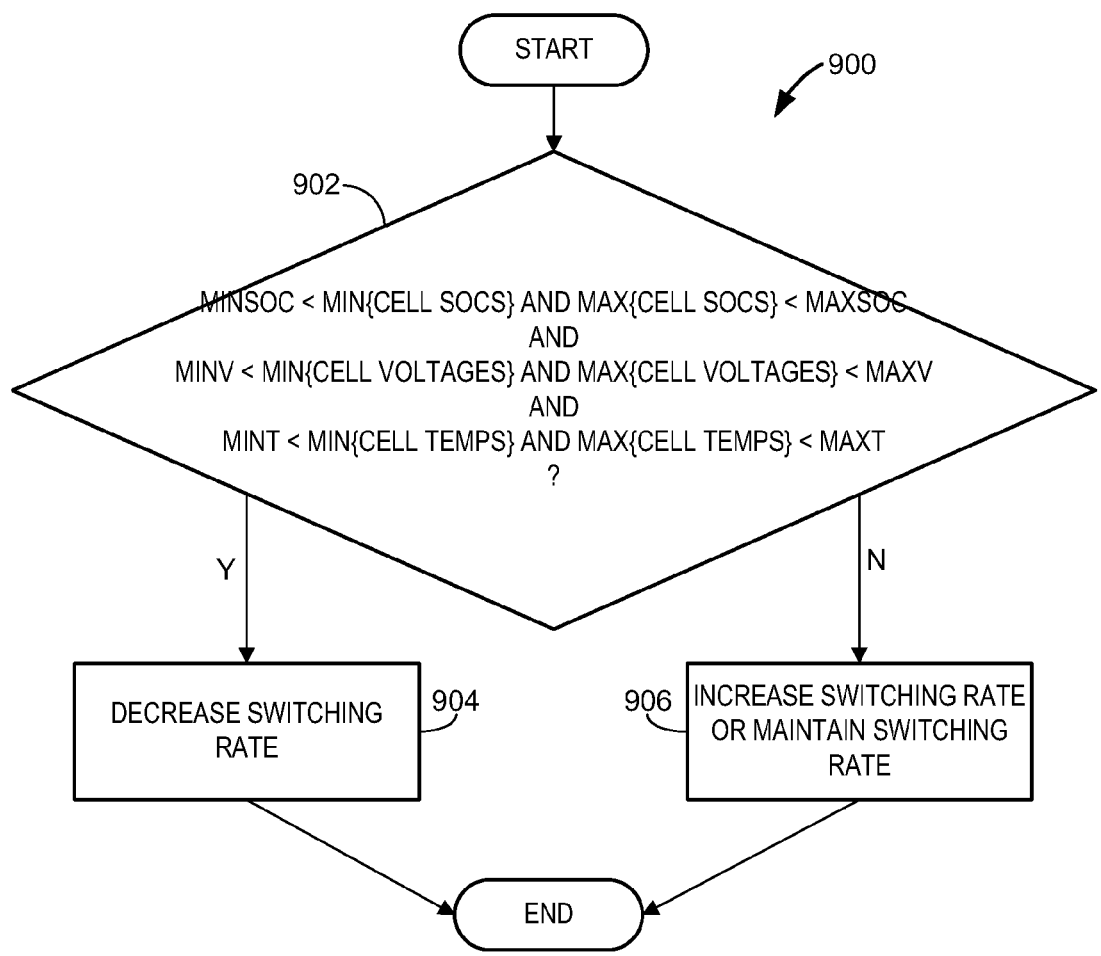
FIG. 9 shows an example method for switching sampling of battery cells of a battery pack.
Figure 10:
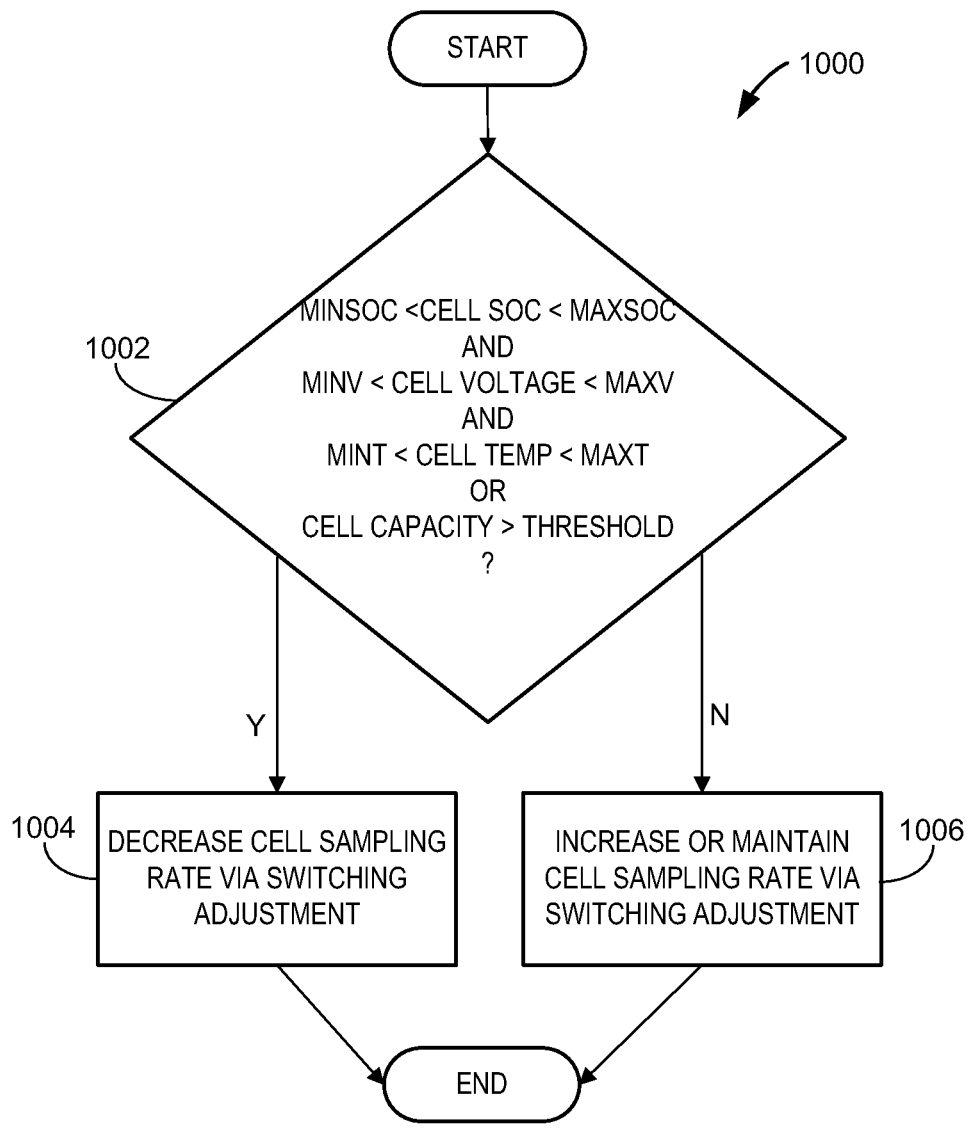
FIG. 10 shows another example method for switching sampling of battery cells of a battery pack.

Various methods are provided for adjusting switching rates of a battery management system in response to various battery cell conditions, e.g., as shown in the example methods in FIGS. 8-10. For example, the sampling rate of a cell in a group may be reduced by adjusting switching rates among cells in the group in regions of the cell voltage curve where large charge or discharge changes result in small changes in cell voltage. In other words, even thought the sampling rate of the analog to digital converter is maintained, any given cell may be sampled at a different rate by changing the switching rate, assuming the sampling rate of the analog to digital converter is sufficiently faster than the switching rate.

For example, the individual cell sampling rates of a battery management system may be adjusted via switch adjustments in response to a temperature and state of charge of a battery cell in a battery pack. As one example, sampling rates of cells may be reduced by reducing the switching rate when the state of charge and temperature of one or more battery cells (or of a particular cell) in the pack are within predetermined ranges and increased when the state of charge and temperature are outside the predetermined ranges. Such predetermined ranges may be obtained from cell voltage profiles or equivalent battery cell information, in one example.

Figure 1:
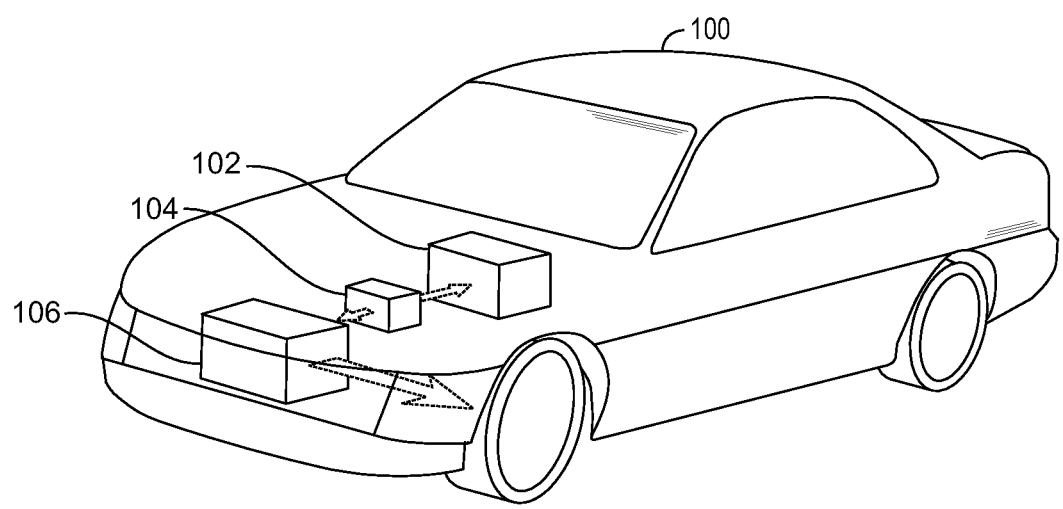
FIG. 1 shows a schematic view of a battery control system in a vehicle.

Turning now to FIG. 1, a schematic view of a non-limiting application of the systems and methods described herein is shown. In particular, a battery pack 102 may be installed in a vehicle 100 for the purpose of supplying energy to propel vehicle 100 by way of electric motor 106. A vehicle controller 104 may facilitate communication between battery pack 102 and motor 106. In one example, vehicle 100 may be propelled solely by electric motor 106. In another example, vehicle 100 may be a hybrid vehicle that may be propelled by an electric motor and an internal combustion engine.

Battery packs used in such applications may be configured in a variety of ways and may include any number of battery cells arranged in a variety of configurations. By way of example, FIG. 2 shows an exploded view of an example battery pack or assembly 201. Battery assembly 201 may include a cover 210, coupling devices 212, a first cooling subsystem 214 (e.g., a cold plate), a plurality of battery modules 216, a second cooling subsystem 218 (e.g., a cold plate), and a tray 220. The cover may be attached to the tray via a suitable coupling device (e.g., bolts, adhesive, etc., to form a housing surrounding the coupling devices, the cooling subsystems, and the battery modules, when assembled.

The battery modules 216 may include a plurality of battery cells configured to store energy. Although a plurality of battery modules are illustrated, it will be appreciated that in other examples a single battery module may be utilized. Battery modules 216 may be interposed between the first cooling subsystem 214 and the second cooling subsystem 218, where the battery modules are positioned with their electrical terminals on a side 221 facing out between the cooling subsystems.

Each battery module may include a first side 223 and a second side 225. The first and the second side may be referred to as the top and bottom side, respectively. The top and bottom sides may flank the electrical terminals. In this example, the top side of each battery module is positioned in a common plane in the battery assembly. Likewise, the bottom side of each battery module is positioned in another common plane in the battery assembly. However, in other examples only the top side or the bottom side of each battery module may be positioned in a common plane. In this way, the cooling subsystems may maintain direct contact with the top sides and the bottom sides of the battery modules to increase heat transfer and cooling capacity. In other examples, only one of the cooling subsystems may be included in battery assembly 201, such as an upper cooling subsystem (subsystem 214 in this example). Moreover, the position, size, and geometry of the first and second cooling subsystems are exemplary in nature. Thus, the position, size, and/or geometry of the first and/or second cooling subsystems may be altered in some examples based on various design parameters of the battery assembly.

Battery assembly 201 may also include an electrical distribution module 233 (EDM), monitor and balance boards 235 (MBB), and a battery control module 237 (BCM). Voltage of battery cells in battery modules 216 may be monitored and balanced by MBBs that are integrated onto battery modules 216. Balancing battery cells refers to equalizing voltages between a plurality of battery cells in a battery cell stack. Further, battery cell voltages between battery cell stacks can be equalized. MBBs may include a plurality of current, voltage, and other sensors. The EDM controls the distribution of power from the battery pack to the battery load. In particular, the EDM contains contactors for coupling high voltage battery power to an external battery load such as an inverter.

The BCM provides supervisory control over battery pack systems. For example, the BCM may control ancillary modules within the battery pack such as the EDM and cell MBB, for example. Further, the BCM may be comprised of a microprocessor having random access memory, read only memory, input ports, real time clock, output ports, and a computer area network (CAN) port for communicating to systems outside of the battery pack as well as to MBBs and other battery pack modules.

FIG. 3 shows an example battery module 300 that may be included in a plurality of battery modules, such as the plurality of battery modules shown in FIG. 2. Battery module 300 may include a plurality of stacked battery cells 303 and output terminals 301. The stacked arrangement allows the battery cells to be densely packed in the battery module.

The battery cells 303 may be strapped together by binding bands 304 and 305. The binding bands may be wrapped around the battery cell stack or may simply extend from the front of the battery cell stack to the back of the battery cell stack. In the latter example, the binding bands may be coupled to a battery cover. In other examples, the binding bands may be comprised of threaded studs (e.g., metal threaded studs) that are bolted at the ends. Further, various other approaches may be used to bind the cells together into the stack. For example, threaded rods connected to end plates may be used to provide the desired compression. In another example, the cells may be stacked in a rigid frame with a plate on one end that could slide back and forth against the cells to provide the desired compressive force. In still other examples, rods held in place by cotter pins, or the like, may be used to secure the battery cells in place. Thus, it should be understood that various binding mechanisms may be used to hold the cell stack together, and the application is not limited to metal or plastic bands. Cover 306 provides protection for battery bus bars (not shown) that route charge from the plurality of battery cells to output terminals of the battery module.

Battery module 300 may also include a front end cover 308 and a rear end cover 310 coupled to the battery cell stack. The front and rear end covers include module openings 326. However, in other examples the module openings may be included in a portion of the battery module containing battery cells.

FIG. 4 shows an exploded view of a portion of an example battery cell stack 400. As shown, the battery cell stack may be built in the order of a housing heat sink 410, battery cell 412, compliant pad 414, battery cell 416, and so on. However, it will be appreciated that other arrangements are possible. For example, the battery cell stack may be built in the order of a housing heat sink, battery cell, housing heat sink, etc. Further in some examples, the housing heat sink may be integrated into the battery cells.

Battery cell 412 includes a cathode 418 and an anode 420 for connecting to a bus bar (not shown). The bus bar routes charge from one battery cell to another. A battery module may be configured with battery cells that are coupled in series and/or parallel. Bus bars couple like battery cell terminals when the battery cells are combined in parallel. For example, the positive terminal of a first battery cell is coupled to the positive terminal of a second battery cell to combine the battery cells in parallel. Bus bars also couple positive and negative terminal of battery cell terminals when it is desirable to increase the voltage of a battery module.

Battery cell 412 further includes a prismatic cell 424 that contains electrolytic compounds. Prismatic cell 424 is in thermal communication with cell heat sink 426. Cell heat sink 426 may be formed of a metal plate with the edges bent up 90 degrees on one or more sides to form a flanged edge. In the example of FIG. 4, two opposing sides include a flanged edge. However, other geometries are possible. Battery cell 412 is substantially identical to battery cell 416. Therefore similar parts are labeled accordingly. Battery cells 412 and 416 are arranged with their terminals in alignment and exposed.

In some examples, a compliant pad 414 may be interposed between battery cell 412 and battery cell 416. However, in other examples the compliant pad may not be included in the battery cell stack.

Housing heat sink 410 may be formed by a metal plate having a base 428 with the edges bent up 90 degrees on one or more sides to form a flanged edge. In FIG. 4, longitudinally aligned edge 430 and vertically aligned edges 432 are bent flanged edges. As depicted, the housing heat sink is sized to receive one or more battery cells so that one or more battery cells may be positioned within base 428. Thus, the flanged edges of the battery cells may be in contact with housing heat sink 410 and underside 429 of battery cell 412 may be in contact with the base of the housing heat sink, facilitating heat transfer.

One of the longitudinally aligned edges 432 of the housing heat sink 410 may form a portion of the top side 302 of battery module 300, as shown in FIG. 3. Similarly, one of the longitudinally aligned edges 432 may form a portion of the bottom side of the battery module. Thus, the longitudinally aligned edges of the housing heat sink may be in contact with the first and the second cooling subsystems to increase heat transfer. In this way, heat may be transferred from the battery cells to the exterior of the battery module.

Figure 5:
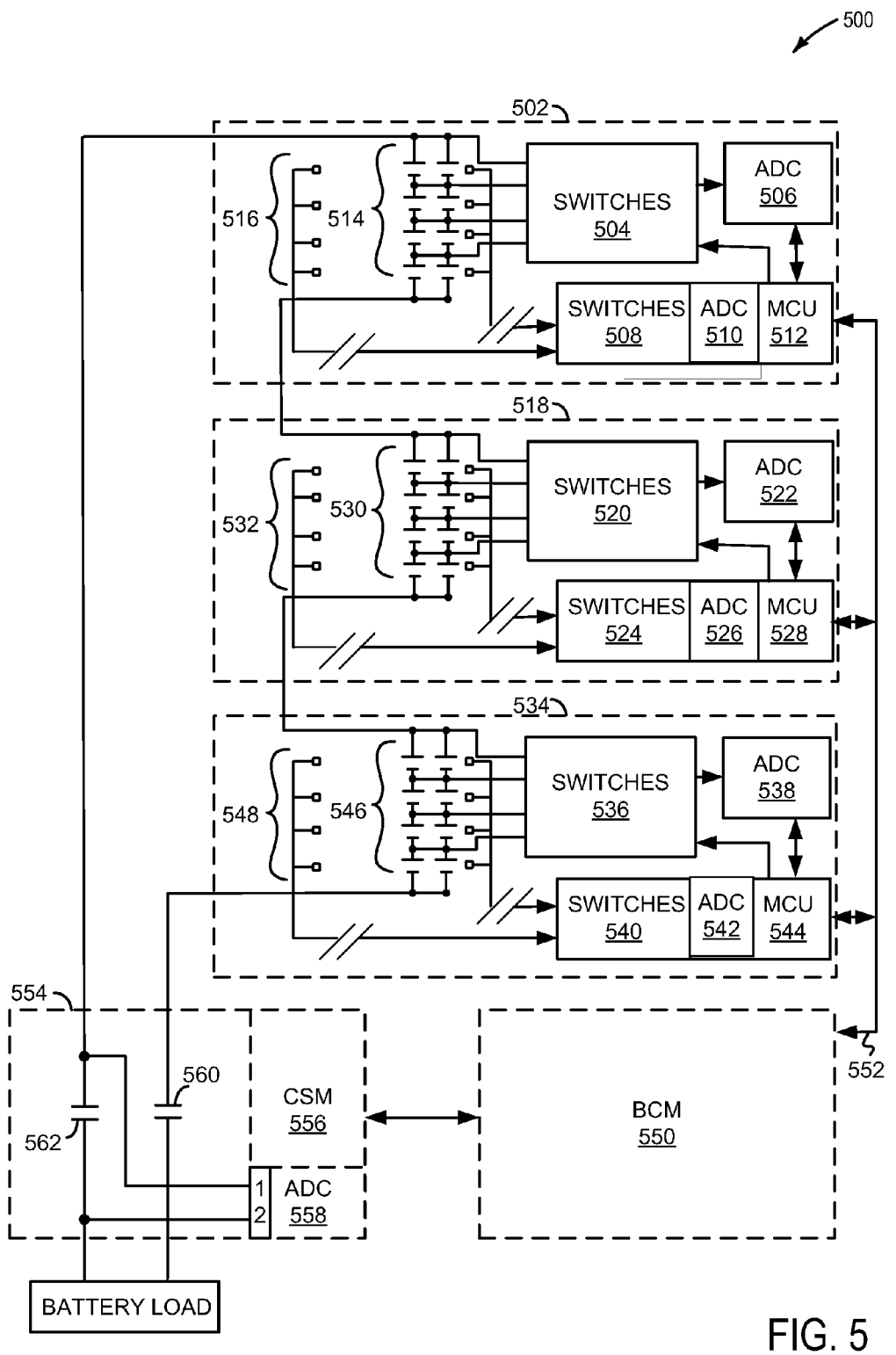
FIG. 5 shows a schematic view of a system for sampling battery cells of a battery cell stack.

FIG. 5 shows a schematic depiction of an example battery assembly 500 wherein a battery control module may adjust sampling and switching rates based on various properties of the cells while monitoring the cells contained therein.

Battery assembly 500 includes a plurality of battery cell stacks 502, 518, and 534. Each battery cell stack includes a plurality of battery cells. For example, battery cell stack 502 includes a plurality of cells 514, battery cell stack 518 includes a plurality of cells 530, and battery cell stack 534 includes a plurality of cells 546.

In this example, battery pack 500 includes three battery cell stacks 502, 518, and 534 as indicated by the dashed lines. The plurality of battery cells 514, 530, and 546 within each stack are shown identically configured and are connected in series. Each battery cell stack outputs a voltage that is related to the number and configuration of battery cells contained therein. Further, the current capacity or amp-hour rating of each battery cell stack may be related to the number of and configuration of the battery cells contained therein.

Though FIG. 5 shows a battery assembly including three battery cell stacks where each battery cell stack includes eight battery cells, it should be understood that a battery assembly may include various numbers and configurations of battery cell stacks and each battery cell stack may include various numbers and configurations of battery cells. For example, the battery cell stacks may be connected in series and/or parallel Likewise, the battery cells in each battery cell stack may be connected in series and/or parallel.

Each battery cell stack in battery assembly 500 includes a high resolution, e.g., 12, 14, or 16 bit, analogue to digital converter (ADC) coupled to the plurality of battery cells in said stack. Communication between the high resolution analogue to digital converter is managed by a switching device included in the stack. For example, stack 502 includes a high resolution ADC 506 and switching device 504, stack 518 includes high resolution ADC 522 and switching device 520, and stack 534 includes high resolution ADC 538 and switching device 536. The high resolution ADCs, e.g., ADC 506, 522, and 538, in a battery pack are configured to sample, via the corresponding switches, e.g., switches 504, 520, and 536, a cell voltage of the cells in the cell stacks. In some examples, e.g., as shown in FIG. 8 described below, the state of charge of a cell may be determined based on sampling of voltage and/or current as sampled by a high resolution ADC via the switches.

Each cell in each battery cell stack may include a temperature sensor. However, in some examples, a temperature sensor may be assigned to a plurality of cells within a stack. Each temperature sensor may be disposed within or adjacent to the corresponding cell or cells. Further, temperature of a first stack may be estimated based on a temperature sensor coupled to another, e.g., adjacent, stack. Alternatively, or in addition, a temperature sensor positioned in the pack in a region near a cell or cell stack may be used to infer temperature of the cell or cell stack based on temperature modeling, heat transfer estimates, and the like, of the battery module or pack, where the temperature sensor is also used for monitoring and controlling cell, stack, or pack cooling (e.g., via coolant pump speed, etc.).

The temperature sensors within each cell stack may be coupled to a low resolution (e.g., 8 bit) ADC included in the stack. Communication between the low resolution ADC may be managed by a switching device also included in the stack. For example, stack 502 includes a plurality of temperature sensors 516 coupled to the plurality of cells 514 and low resolution ADC 510 via switching device 508; stack 518 includes a plurality of temperature sensors 532 coupled to the plurality of cells 530 and low resolution ADC 526 via switching device 524; and stack 534 includes a plurality of temperature sensors 548 coupled to the plurality of cells 546 and low resolution ADC 542 via switching device 524.

Via the groups of switches, the ADCs in battery 500 may sample voltage, current, and/or temperature of the cells in battery 500. In some examples, each ADC in a battery cell stack may sample the cells in said battery cell stack at different times.

Each battery cell stack in battery assembly 500 further includes a controller (MCU) in communication with the battery control module (BCM) 550. Each controller in a stack is configured to adjust a sample rate of the ADCs in each stack and to adjust the rates at which different battery cell stacks are in communication with the ADCs, e.g., via the switching devices. For example, stack 502 includes controller 512 coupled to high resolution ADC 506, low resolution ADC 510, switching device 504, and switching device 508.

Sampling of the battery cells via switches may be performed in a variety of ways. For example, a sample capacitor may be included for each battery cell, where each sample capacitor is configured to charge and hold cell voltages. A sample line may control a group of switches (e.g., a group of field-effect transistor (FET) switches) which are configured to selectively connect each sample cap to the associated cell. Individual read lines (one per cell) may be included and configured to connect one of the sample caps to a front end of an ADC converter. These individual read lines (e.g., READ1-READN, where N is the number of cells) and the sample line may be controlled by the controller (e.g., MCU), based on instructions from the BCM 550. The process during a cell voltage read may be performed as follows: SAMPLE=ON, WAIT 1 ms, SAMPLE=OFF, READ1=ON, TRIGGER ADC, READ1=OFF and READ2=ON, TRIGGER ADC, etc., so that all N cells connected to the MBB are read. In this example, it is assumed that the cell voltage multiplex is discrete using a single input ADC and manually controlled by the controller. However, other sampling examples may include using an ADC with an N-channel MUX built in. Such a system would have a single READ line that connects all sample caps to their separate ADC mux inputs.

Battery control module (BCM) 550 may communicate with each controller, e.g., MCUs 512, 528, and 544, in the stacks via a CAN bus 552 or similar communication bus. BCM 550 may acquire status indicators (e.g., flags that indicate degradation of an ADC, battery cell, MCU, etc.) from the battery cell stacks. BCM 550 may also communicate with an electrical distribution module (EDM) 554 for sending instructions to close contactors 562 and 560 when it is desirable to couple the battery cell stacks to a battery load. EDM 554 may also include a current sensing module (CSM) 556 configured to sense an amount of current and/or voltage provided by the stacks. CSM 556 may include an ADC 558 configured to sample battery pack voltage and/or current and provide voltage and/or current data to BCM 550. In some examples, ADC 558 or another ADC may also measure battery pack voltage and/or current on the load side of contactors 562 and 560.

In order to reduce an amount of parasitic energy and bandwidth consumption by a battery management system, sampling of the cells in a battery pack may be adjusted based on various operating conditions of one or more cells in a battery, e.g., to reduce the number of times energy is drawn from battery cells by a battery management system for measurement purposes and reduce the number of communication messages which use battery power to drive a communication bus.

Sampling of battery cells in a battery pack may be adjusted in a variety of ways. For example, sample rates of analogue to digital converters, e.g., ADCs 506, 522, 538, 510, 526, and 524 shown in FIG. 5, may be adjusted based on various operating conditions of the battery. As another example, switching rates of switches, e.g., switches 504, 508, 520, 524, 536, and 540 shown in FIG. 5, which are configured to selectively put cells in a battery in communication with corresponding ADCs, may be adjusted based on various operating conditions of the battery. Additionally, combinations of the above adjustments may be used, if desired.

FIG. 6 shows an example plot of a voltage profile of a battery cell during discharge. Such a cell voltage profile may be used to establish predetermined ranges of temperature, state of charge, and/or voltage wherein large changes in charge or discharge of the cell, e.g., when the battery is in use by a vehicle, result in small changes in cell voltages. Understanding the application of the battery in a vehicle context, it is possible to identify regions where the plausible change in cell voltage, for example, may be confined to predetermined rates based on temperature and SOC, for example.

Specifically, FIG. 6 shows a plot 600 of battery cell discharge voltage curves of a battery cell which may be included in a battery pack. Plot 600 shows how the cell voltage changes in response to changes in SOC (x-axis) and temperature of the cell and is generated by applying a coulomb of charge to the cell to increase the state of charge of the cell at different temperatures. By way of example, plot 600, shows such voltages profiled for a battery cell at five different increasing temperatures T1, T2, T3, T4, and T5, where T1<T5. For example, T1=−15° C., T2=−5° C., T3=5° C., T4=20° C., and T5=50° C.

Boxed region 602 shows an example reduced sampling rate zone which defines an example predetermined SOC range, voltage range, and temperature range within box 602. The boxed region 602, shows an example region where large changes in state of charge result in small voltage changes, e.g., wherein the slopes of the voltage curves are less than a threshold value.

In some examples, the sampling rates a battery cell may be reduced via adjustment of switches when one or more of cell temperature, voltage, and/or SOC are within the predetermined ranges defined by box 602. Specifically, the rate at which the cell is put in communication with an ADC, e.g., via a group of switches, may be reduced when one or more of cell temperature, voltage, and/or SOC are within the predetermined ranges defined by box 602. Namely, box 602 shows predetermined upper and lower SOC limits, upper and lower temperature limits, and upper and lower voltage limits. When an operating condition of the cell, e.g., a sampled temperature, voltage, and/or SOC, falls within a predetermined range, then the switching rate may be reduced as described above.

However, when an operating condition of the cell, e.g., a sampled temperature, voltage, and/or SOC of the cell, falls outside these predetermined ranges, then the switching rate may be increased or maintained as described above.

By selectively controlling the sampling and switching rates of a cell based on operating conditions of the cell, the cells of a battery may be sampled a greater number of times during cell conditions approaching the discharge and charge limits (e.g., in regions outside of box 602) and the cells of the battery may be sampled a lesser number of times during cell conditions where large SOC changes have a small effect on the voltage of the cell (e.g., within boxed region 602).

FIG. 7 shows an example method 700 for monitoring a battery. As described above, the battery cells in a battery pack may be monitored to reduce degradation of the battery due to overcharging or overdischarging.

At 702, method 700 includes determining if entry conditions for monitoring a battery are met. Entry conditions for monitoring a battery may include whether or not the battery is in operation versus in a shut-down, or sleep mode. For example, the routine may identify whether the battery is undergoing charging or discharging. In some examples, entry conditions may included whether or not the battery was recently fully charged. For example, in some examples, a battery may not be monitored for a predetermined duration following a charging event wherein the battery cells were charged to a threshold capacity. If entry conditions for monitoring the battery are met at 702, method 700 proceeds to 704.

At 704, method 700 includes determining battery operating conditions. Determining battery conditions may include determining charge or discharge rates of a battery pack, voltage of the battery pack, current of the battery pack, among others.

At 706, method 700 included determining whether or not to selectively sample the calls in a battery pack. As described above, reducing the number of samples performed by a monitoring system may reduce parasitic energy consumption and increase available bandwidth on a communication bus. Thus, in some examples, all of the cells in a battery pack may not be sampled during some conditions, but rather only a subset of cells may be sampled. Selectively sample cells in a battery pack may be based on a variety of cell parameters. For example, cell capacity, which may be predetermined and/or estimated on-line in real-time, may be used to select which cells are selectively sampled and which cells are not. An example method for selectively sampling a battery cell based on cell capacities in described below herein with reference to FIG. 8. For example, cells having a lower cell state of health, or lower cell charge capacity, may be selectively samples more a greater number of times than other cells in a given sample window, or may be sampled at a greater sample rate, or combinations thereof.

If at 706, selective cell sampling is not employed, then method 700 proceeds to step 708. At 708, method 700 includes sampling voltages of the battery cells in the battery pack. The voltage of a battery cell may be determined via a voltage sensor disposed within or adjacent to said cell. For example, as shown in FIG. 5, switches 504, 520, and 536 which are coupled to the cells of the battery may put the terminals of one or more cells in battery 500 in communication with a corresponding ADC to sample the voltage. In one example, each cell of a group of cells coupled to a corresponding ADC is sampled, and such actions are performed in parallel for each group of cells such that all cells in the pack are sampled.

At 710, method 700 includes determining the state of charge of the battery cells. Various methods are available to determine the state of charge of a battery cell, e.g., voltage translation or coulomb counting. By knowing the state of charge of a battery cell it may be possible to determine whether or not the battery cell may accept additional charge, allowable charging rates, etc. Further, by knowing the state of charge of a battery cell it may be possible to determine when it is undesirable to further discharge a battery cell, allowable discharging rates, etc.

In some examples, a state of charge of a single battery cell or a group of battery cells may be determined from the voltage and current of the cell or cell group. For example, the current of a battery cell may be determined via a current sensor disposed within or adjacent to said cell. A non-limiting example method for determining the state of charge of a battery cell based is described below herein with regard to FIG. 12.

At 712, method 700 includes sampling the temperatures of the battery cells. For example, the temperature of a battery cell may be determined via a temperature sensor disposed within or adjacent to said cell. For example, as shown in FIG. 5, switches 508, 524, and 540 which are coupled to the temperature sensors in the cells battery may put the sensors of one or more cells in battery 500 in communication with a corresponding ADC to sample the temperature.

At 714, method 700 includes adjusting switching of one or more of the switches based on cell SOC, temperature, capacity, voltage, and/or other battery conditions or parameters. Namely, at 714 methods 700 includes adjusting switching rates at which different battery cells are in communication with said analogue to digital converter in response to the battery cell conditions determined in the previous steps. Furthermore, the switching rates may be adjusted differently for different groups of switches. For example, FIG. 5, shows a battery pack including three cell stacks 502, 518, and 534. Each cell stack in battery pack 500 includes two groups of switches, e.g., switches 504 and switches 508 are included in cell stack 502. Thus a first group of switches may be adjusted by a first switching rate amount in response to conditions of one or more cells coupled to the first group of switches and a second group of switches may be adjusted a second amount in response to conditions of one or more cells coupled to the second group of switches, where the first amount is different from the second amount. In this way, it is possible to obtain faster updates on cells in a first group by switching them into the ACD at a faster rate while other cell groups can be sampled via a slower switching rate.

Example methods for adjusting the switching rates are described in more detail below herein with regard to FIGS. 9 and 10.

However, various predetermined parameters, e.g., cell charge capacity or a degree of degradation of the cell's charge capacity, may influence discharge-charge rates of the cell. For example, a battery cell with a lower capacity may become overcharged or overdischarged before another cell in the same stack with a higher capacity. For example, if both cells are being charged via the same charging voltage, in some examples, a battery cell with a lower capacity may be sampled a greater number of times (e.g., at a faster rate or more often) than a battery cell with a higher capacity in order to reduce overcharge or overdischarge conditions. Thus in some examples, in order to reduce the number of samples take during the monitoring process, the cells in a battery pack may be selectively sampled, as noted above. Returning to step 706 in method 700, if selective sampling is employed at 706, then method 700 proceeds to 716.

At 716, method 700 includes sampling the voltages of one or more cells with the lowest capacities (or lower than other cells in a common stack, or pack), where the voltage of a cell is determined as described above. At 718, method 700 includes determining the state of charges of the one or more cells with the lowest capacities, where the state of charge of a cell is determined as described above. At 720, method 700 includes sampling the temperatures of the one or more cells with the lowest capacities, where the temperature of a cell is determined as described above.

Following the selective sampling of cells with the lowest capacity, method 700 proceeds to step 714 adjusting switching based on cell SOC, temperature, capacity, voltage, and/or other battery conditions or parameters, as described above.

FIG. 8 shows an example method 800 for selectively sampling battery cells in a battery. As described above, various predetermined parameters, e.g., capacity, of a cell in a battery may influence discharge-charge rates of said cell. For example, a battery cell with a lower capacity may become overcharged or overdischarged before a battery cell with a higher capacity, where both cells are being concurrently charged/discharged. Thus, in some examples, a battery cell with a lower capacity may be switched to the ADC a greater number of times, more often, or combinations thereof, than a battery cell with a higher capacity in order to reduce overcharge or overdischarge conditions.

At 802, method 800 includes determining the capacity of a plurality of cells. In some examples, the capacities of the cells in a battery may be predetermined and stored in a memory component of a battery management system, and updated on-line via various adaptive algorithms, for example.

At 804, method 800 includes determining a threshold capacity based on the capacities of the plurality of cells. For example, the threshold capacity may be a minimum capacity of the capacities of the plurality of cells. As another example, the threshold capacity may be a predetermined threshold capacity.

At 806, method 800 includes determining, for each cell in the plurality of cells, if the cell capacity is less than or equal to the threshold capacity. If, for a given cell in the plurality of cells, such as a stack of cells or a group of cells in a pack (in parallel, series, or combinations thereof as noted herein), the cell capacity is less than or equal to the threshold capacity, then method 800 proceeds to 810 to sample the cell, e.g., the voltage of the cell may be sampled and the SOC determined for the cell. However, if, for a given cell in the plurality of cells, the cell capacity is greater than threshold capacity at 806, then method 800 proceeds to 808, to not sample the cell, e.g., the voltage of the cell is not sampled, but rather another cell is sampled in its place, for example, such as a cell whose capacity is less than the threshold.

By selectively sampling the cells in this way, more efficient data sampling may be obtained as cells who may reach a minimum voltage first are samples more often, at faster rates, or combinations thereof.

FIG. 9 shows an example method 900 for adjusting a rate at which different battery cells of a battery cell stack are in communication with an analogue to digital converter. For example, method 900 may be individually employed for each group of switches in a battery pack. As described above, the switching rates may be adjusted differently for different groups of switches. For example, FIG. 5, shows a battery pack including three cell stacks 502, 518, and 534. Each cell stack in battery pack 500 includes two groups of switches, e.g., switches 504 and switches 508 are included in cell stack 502. Thus a first group of switches may be adjusted a first amount in response to conditions of one or more cells coupled to the first group of switches and a second group of switches may be adjusted a second amount in response to conditions of one or more cells coupled to the second group of switches, where the first amount is different from the second amount.

At 902, method 900 includes determining if various conditions of the cells coupled to a group of switches fall within a predetermined range, e.g., 602 shown in FIG. 6. For example, 902 may monitor a group of cells coupled to a common ADC, or a subgroup of cells coupled to a common ADC. Further, it may monitor cells across a plurality of ADCs. Specifically, 902 includes determining if the following conditions are met: the minimum of the cell SOCs is greater than a predetermined minimum SOC threshold, MINSOC, and the maximum of the cell SOCs is less than a predetermined maximum SOC threshold MAXSOC; the minimum of the cell voltages is greater than a predetermined minimum voltage threshold, MINV, and the maximum of the cell voltages is less than a predetermined maximum voltage threshold MAXV; the minimum of the cell temperatures is greater than a predetermined minimum temperature threshold, MINT, and the maximum of the cell temperatures is less than a predetermined maximum temperature threshold MAXT.

In some examples, if one or more of these conditions are met at 904, then method 900 proceeds to 904. In other examples, if all of these conditions are met at 904, then method 900 proceeds to 904. At 904, method 900 includes decreasing the rate at which the cells coupled to the group of switches are put in communication with an ADC. However, if none of the conditions are met at 904, method 900, then method 900 proceeds to 906. At 906, method 900 includes increasing or maintaining the rate at which the cells coupled to the group of switches are put in communication with an ADC. For example, if any one of the cells in the pack fall outside the thresholds of 902, then the switching rate of all ADCs in the pack may be increased or decreased as noted (904, 906).

Alternatively, if one or more cells of a cell stack coupled to a common ADC fall outside the thresholds of 902, then the switching rate of that ADC may be increased or decreased as noted (904, 906). Such an example is illustrated in FIG. 10. Specifically, FIG. 10 shows another example method 1000 for adjusting a rate at which different battery cells of a battery cell stack are in communication with an analogue to digital converter. For example, method 1000 may be individually employed for each group of switches in a battery pack. Further, method 1000 adjusts the switching rates of individual cells based on the conditions of the cells rather than adjusting the switching rates of all cells as in method 900 described above.

At 1002, for each cell in a plurality of cells coupled to a group of switches, method 1000 includes determining if various conditions of the within a predetermined range, e.g., box 602 shown in FIG. 6. Specifically, step 1002 includes determining if the following conditions are met for each cell: the cell SOC is greater than the predetermined minimum SOC threshold, MINSOC, and less than the predetermined maximum SOC threshold MAXSOC; the cell voltage is greater than the predetermined minimum voltage threshold, MINV, and less than the predetermined maximum voltage threshold MAXV; the cell temperature is greater than the predetermined minimum temperature threshold, MINT, and less than the predetermined maximum temperature threshold MAXT.

In some examples, if one or more of these conditions are met at 1004, then method 1000 proceeds to 1004. In other examples, if all of these conditions are met at 1004, then method 1000 proceeds to 1004. At 1004, method 1000 includes decreasing the rate at which the cell coupled to the group of switches is put in communication with an ADC.

However, if none of the conditions are met at 1004, method 1000, then method 1000 proceeds to 1006. At 1006, method 1000 includes increasing or maintaining the rate at which the cell coupled to the group of switches is put in communication with an ADC.

Figure 11:
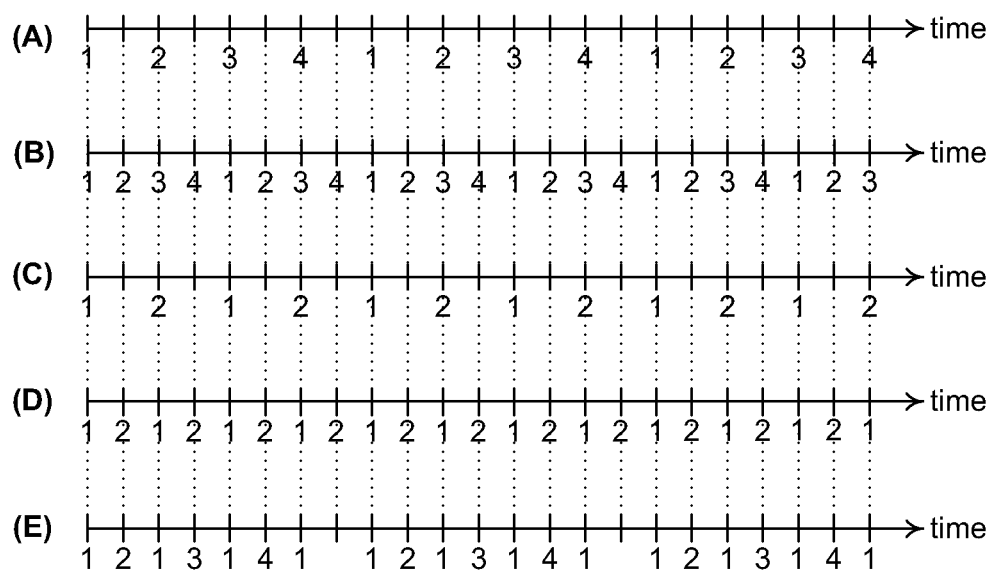
FIG. 11 shows example cell sampling sequences adjusted via switches.

FIG. 11 shows various example cell sampling sequences adjusted via switches in order to illustrate example operations according to the methods described herein. The example cell sampling sequences shown in FIG. 11 may apply to a battery including four cells coupled to a switching circuit, where the switching circuit is configured to selectively put the cells in communication with an ADC to sample various cell conditions, such as cell voltage and cell temperature.

Specifically, FIG. 11 shows five time plots A-E, the cell numbers under each time axis indicate that the cell is sampled, at the location of the number. For example, FIG. 11A shows an example of a sequential sampling of cells 1, 2, 3, followed by 4. It should be understood that the examples sampling sequences are exemplary in nature and not intended to limit the scope of this disclosure.

The sampling of the cells shown in FIG. 11 may be controlled by the group of switches configured to selectively put the cells in communication with the ADC. For example, in FIG. 11A, the group of switches puts cell 1 in communication with the ADC, followed by cell 2, and so forth.

FIG. 11B, shows another example of sequential sequencing of the four cells. However, FIG. 11B shows that the switching rate is increased in FIG. 11B relative to the switching rate employed in FIG. 11A. Thus, going from the switching rate shown in FIG. 11A to the switching rate shown in FIG. 11B is an example of increasing the switching rate, e.g., as occurs in step 906 of method 900 described above. Likewise, going from the switching rate shown in FIG. 11B to the switching rate shown in FIG. 11A is an example of decreasing the switching rate, e.g., as occurs in step 904 of method 900 described above.

FIG. 11C shows an example of selectively sampling cells in a battery, such as described above with reference to FIG. 8. For example, cells 1 and 2 may have capacities less than a threshold capacity as described above, thus may be sampled whereas cells 3 and 4 may have capacities above the threshold capacity, thus may not be sampled as shown in FIG. 11C.

FIG. 11D shows an example of adjusting the switching rate while selectively sampling. For example, going from the switching rate shown in FIG. 11C to the switching rate shown in FIG. 11D is an example of increasing the switching rate, e.g., as occurs during selective sampling in step 906 of method 900 described above. Likewise, going from the switching rate shown in FIG. 11D to the switching rate shown in FIG. 11C is an example of decreasing the switching rate, e.g., as occurs during selective sampling in step 904 of method 900 described above.

FIG. 11E shows an example of nonsequential sampling, where, for example, the sampling rate of a first cell may be adjusted a first amount whereas a sampling rate of a second cell may be adjusted a second, different amount. FIG. 11E illustrates an example adjustment as described above with regard to FIG. 10 wherein the sampling rates of individual cells may be individual adjusted based on one or more conditions of said cell. In the example shown in FIG. 11E, the sampling rate of cell 1 is increased while the sample rates of cells 2, 3 and 4 remain unchanged relative to the sampling scheme shown in FIG. 11A. For example, at least one of cell 1's capacity, SOC, temperature, and voltage may be outside the predetermined ranges determined from the cells voltage profile.

Figure 12:
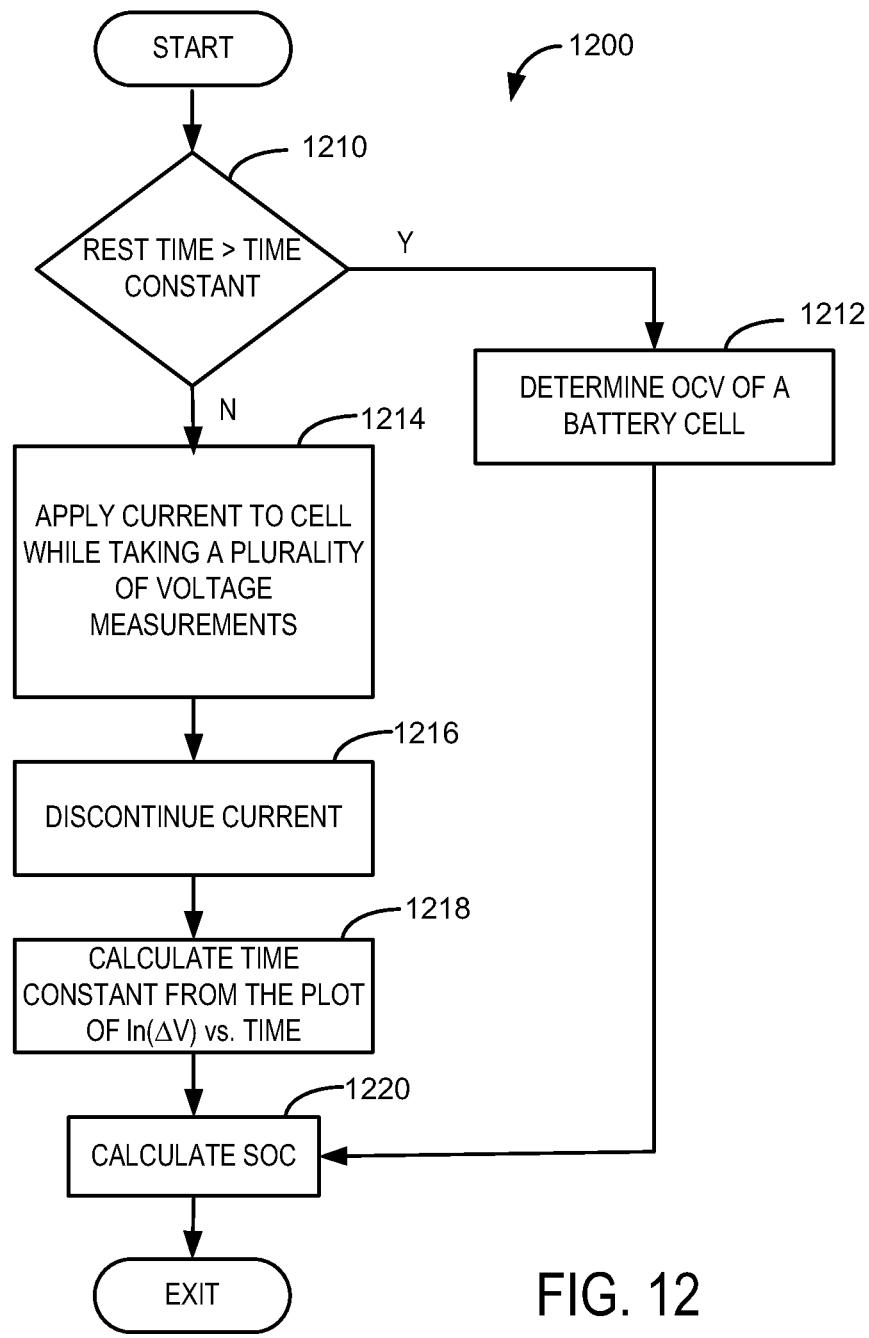
FIG. 12 shows an example method for determining a state of charge of a battery cell.

FIG. 12 shows an example method 800 for determining a state of charge of a cell. At 1210, method 1200 includes determining if a rest time is greater than a predetermined time constant of relaxation. A rest time may be a time during which a battery cell reaches its steady state open-circuit voltage (OCV). The predetermined time constant of relaxation may be determined by applying a current to the battery cell while taking a plurality of voltage (V) measurements. The current to the battery cell may then be discontinued and a logarithm of a plurality of differences $V_{t\_last}-V_t$ may be plotted, wherein $V_{t\_last}$ is a final voltage recorded after the current is discontinued and $V_t$, is a voltage recorded at time T. A slope of a linear fit of the logarithmic plot of the plurality of differences $V_{t\_last}-V_t$ may then be used to determine the predetermined time constant of relaxation, e.g., the predetermined time constant of relaxation may be the inverse of said slope.

If at 1210, method 1200 determines that the rest time is greater than the predetermined time constant then the OCV of the battery cell may be utilized to calculate the state of charge of the battery cell and method 1200 proceed to step 812. At 1212, method 1200 includes determining the OCV of the battery cell to determine the SOC of said battery cell.

However, if the rest time is not greater than the predetermined time constant of relaxation at step 1210, then method 1200 proceeds to step 1214. At 1214, method 1200 includes applying a current to the battery cell while taking a plurality of voltage (V) measurements. At 1216, method 1200 includes discontinuing current supplied to the cell. At 1218, method 1200 includes determining the time constant from the plurality of voltage measurements via a logarithmic plot of the plurality of differences $V_{t\_last}-V_t$ as described above. At 1220, routine 1200 calculates the SOC of the battery cell utilizing the time constant determined in step 1218.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for switching sampling of battery cells of a battery pack, comprising:
adjusting a rate at which different battery cells of a battery cell stack are in communication with an analog to digital converter, said rate adjusted in response to a condition of a battery cell, where said rate at which different battery cells of said battery cell stack are in communication with said analog to digital converter is different from a rate at which different battery cells of a second battery cell stack are in communication with a second analog to digital converter, said second battery cell stack different from said battery cell stack.

2. The method of claim 1, where communication between said different battery cells and said analog to digital converter is controlled by at least a switch.

3. A method for switching sampling of battery cells of a battery pack, comprising:
adjusting a rate at which different battery cells of a battery cell stack are in communication with an analog to digital converter, said rate adjusted in response to a condition of a battery cell, wherein the battery cells include a first cell with a first capacity and a second cell with a second capacity greater than the first capacity, wherein the first cell is switched into communication with the analog to digital converter more often than the second cell.

4. The method of claim 3, where said condition is a voltage of said battery cell.

5. The method of claim 4, where said rate is further adjusted in response to at least one of a battery cell state of charge and a temperature of a battery cell.

6. The method of claim 5, where said rate is related to a condition of a single battery cell of said battery cell stack during a selected condition.

7. A method for selectively sampling a plurality of battery cells of a battery pack, comprising:
during a first condition, switching a battery cell in the plurality of battery cells into communication with an analog to digital converter at a first rate and sampling a cell operating condition; and
during a second condition, switching the battery cell into communication with the analog to digital converter at a second rate and sampling the cell operating condition, said second rate greater than said first rate, the sampling rate adjusted by changing the switching rate.

8. The method of claim 7, wherein the first condition includes a state of charge of the battery cell between a lower state of charge threshold and a higher state of charge threshold and wherein the second condition includes a state of charge of the battery cell less than the lower state of charge threshold or greater than the higher state of charge threshold.

9. The method of claim 7, wherein the first condition includes a voltage of the battery cell between a lower voltage threshold and a higher voltage threshold and wherein the second condition includes a voltage of the battery cell less than the lower voltage threshold or greater than the higher voltage threshold.

10. The method of claim 7, wherein the first condition includes a temperature of the battery cell between a lower temperature threshold and a higher temperature threshold and wherein the second condition includes a temperature of the battery cell less than the lower temperature threshold or greater than the higher temperature threshold.

11. The method of claim 7, wherein the first condition includes a capacity of the battery cell greater than a threshold capacity and wherein the second condition includes a capacity of the battery cell less than or equal to the threshold capacity.

12. The method of claim 7, wherein the first and second conditions are based on at least one of state of charges of the plurality of battery cells, temperatures of the plurality of battery cells, voltages of the plurality of battery cells, and capacities of the plurality of battery cells.

13. A system for sampling battery cells of a battery cell stack, the system comprising:
an analog to digital converter;
a plurality of battery cells;
switching circuitry configured to switch each of said plurality of battery cells into communication with said analog to digital converter; and
a controller configured to adjust a rate at which different battery cells of said plurality of battery cells are in communication with and sampled by said analog to digital converter, the controller including controller instructions for adjusting said rate in response to instructions from a battery control module, said battery control module separate from the battery cell stack comprised of said plurality of battery cells.

14. The system of claim 13, further including controller instructions for adjusting said rate in response to at least one of a battery cell voltage, a battery cell state of charge, and a battery cell temperature.

15. The system of claim 13, further comprising at least one temperature sensor for determining a temperature of at least one cell of said plurality of battery cells.

16. The system of claim 13, where said analog to digital converter, said plurality of battery cells, said switching circuitry, and said controller are integrated into a battery cell pack.

17. The system of claim 13, where said plurality of battery cells is part of a battery pack and where said battery pack provides power to a motor of a vehicle.

* * * * *